United States Patent

Bonnell

(10) Patent No.: US 10,860,396 B1
(45) Date of Patent: Dec. 8, 2020

(54) INLINE CATEGORIZING OF EVENTS

(71) Applicant: PagerDuty, Inc., San Francisco, CA (US)

(72) Inventor: Christopher Phillip Bonnell, Longmont, CO (US)

(73) Assignee: PagerDuty, Inc., San Francisco, CA (US)

( * ) Notice: Subject to any disclaimer, the term of this patent is extended or adjusted under 35 U.S.C. 154(b) by 0 days.

(21) Appl. No.: 16/777,748

(22) Filed: Jan. 30, 2020

(51) Int. Cl.
G06F 9/54 (2006.01)
G06F 40/211 (2020.01)
G06F 40/284 (2020.01)
G06F 40/30 (2020.01)

(52) U.S. Cl.
CPC .......... *G06F 9/542* (2013.01); *G06F 40/211* (2020.01); *G06F 40/284* (2020.01); *G06F 40/30* (2020.01)

(58) Field of Classification Search
CPC ...... G05F 9/546; G06F 40/284; G06F 40/211; G06F 40/30; G06F 16/355; G06F 17/3071; G06F 17/277
See application file for complete search history.

(56) References Cited

U.S. PATENT DOCUMENTS

| | | | |
|---|---|---|---|
| 2017/0097962 A1* | 4/2017 | Zeng | G06F 16/93 |
| 2017/0357710 A1* | 12/2017 | Shtossel | G06F 16/355 |
| 2019/0303421 A1 | 10/2019 | Bonnell | |
| 2019/0325029 A1* | 10/2019 | Gandhi | G06F 40/20 |
| 2019/0354524 A1* | 11/2019 | Xu | G06F 11/0709 |
| 2020/0050650 A1* | 2/2020 | Lefebvre | G06Q 10/107 |
| 2020/0110815 A1* | 4/2020 | Garapati | G06F 16/355 |
| 2020/0112475 A1* | 4/2020 | Garapati | H04L 41/0631 |

* cited by examiner

*Primary Examiner* — Brian W Wathen
(74) *Attorney, Agent, or Firm* — John W. Branch; Branch Partners PLLC

(57) ABSTRACT

Embodiments are directed to managing operations over a network. An event associated with network operations may be provided. A hash function may generate key values that correspond to words included in message information associated with the event. A message vector may be generated based on the key values such that each component in the message vector that corresponds to a key value is set to one. Group vectors may be determined such that each group vector is associated with an event group. Similarity scores may be generated for the group vectors based on the message vector and the group vectors such that each group vector corresponds to a separate similarity score. If the similarity scores exceed a threshold, the event may be associated with event groups associated with a group vector that correspond similarity score that exceeds the threshold.

28 Claims, 10 Drawing Sheets

INLINE CATEGORIZING OF EVENTS

TECHNICAL FIELD

The present invention relates generally to computer operations and more particularly, but not exclusively to managing events associated with computer operations.

BACKGROUND

IT systems are increasingly becoming complex, multivariate, and in some cases non-intuitive systems with varying degrees of nonlinearity. These complex IT systems may be difficult to model or accurately understand. Various monitoring systems may be arrayed to provide alerts, notifications, or the like, in an effort to provide visibility to operational metrics, failures, and/or correctness. However, the sheer size and complexity of these IT systems may result in a flooding of disparate event messages from disparate monitoring/reporting services. Today with the increased complexity of distributed computing systems event reporting and/or management may overwhelm IT teams tasked to manage them. At enterprise scale, IT systems may have millions of components resulting in a complex inter-related set of monitoring systems that report millions of events from disparate subsystems. Manual techniques and pre-programmed rules are labor intensive and expensive, especially in the context of large centralized IT Operations with very complex systems distributed across large numbers of components. Further, these manual techniques may limit the ability to scale and evolve for future advances in IT systems capabilities. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
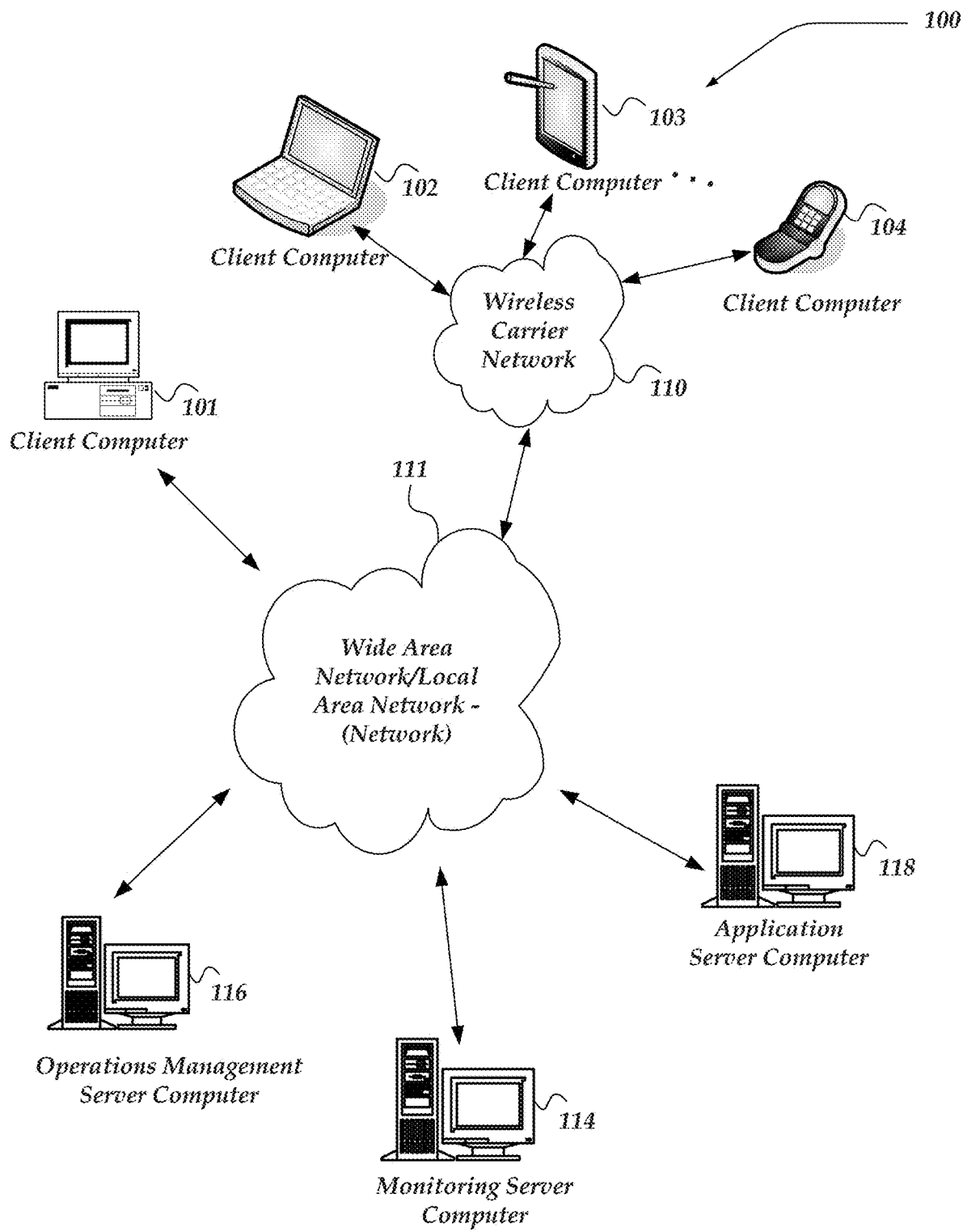
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

The term "organization" as used herein refers to a business, a company, an association, an enterprise, a confederation, or the like.

The term "operations management system" as used herein is computer system that may be arranged to monitor, manage, and compare, the operations of one or more organizations. Operations management system may be arranged to accept various Operations events that indicate events and/or incidents occurring in the managed organizations. Operations management systems may be arranged to manage several separate organizations at the same time. These separate organizations may be considered a community of organizations.

The terms "event" as used herein refer one or more data structures or messages the may report outcomes, conditions, or occurrences that may be detected or observed by an operations management system. Operations management systems may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events may be provided to the operations management system using one or more messages, emails, telephone calls, library function calls, application programming interface (API) calls, including, any signals provided to an operations management system indicating that an event has occurred. One or more third party and/or external systems may be configured to generate event messages that are provided to the operations management system.

The term "incidents" as used herein may refer to a condition or state in the managed networking environments that requires some form of resolution by a user or automated service. Typically, incidents may be a failure or error that occurs in the operation of a managed network and/or computing environment. One or more events may be associated with one or more incidents. However, not all events are associated with incidents.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing operations over a network. In one or more of the various embodiments, an event that may be associated with one or more operations in the network may be provided.

In one or more of the various embodiments, a hash function may be employed to generate one or more key values that correspond to one or more words included in message information that is associated with the event.

In one or more of the various embodiments, a message vector may be generated based on the one or more key values such that each component in the message vector that corresponds to a key value may be set to a value of one.

In one or more of the various embodiments, one or more group vectors that have a same number of components as the message vector may be determined such that each group vector is associated with an event group.

In one or more of the various embodiments, one or more similarity scores may be generated for the one or more group vectors based on the message vector and the one or more group vectors such that each group vector corresponds to a separate similarity score. In some embodiments, generating the one or more similarity scores may include computing one or more cosine similarity values based on the message vector and each of the one or more group vectors such that the one or more cosine similarity values may be employed as the value of the one or more similarity scores.

In one or more of the various embodiments, in response to a portion of the one or more similarity scores exceeding a threshold value, the event may be associated with one or more event groups such that each event group may be associated with a group vector that that corresponds to the separate similarity score that exceeds the threshold value. In some embodiments, associating the event with the one or more event groups may include adding the message vector to each group vector that may be associated with the one or more event groups.

In one or more of the various embodiments, a learner object may be determined based on an association of the learner object with one or more of a user, an account, a service, or an organization. In some embodiments, the learner object may be employed to generate one or more agreement scores based on the message vector and the one or more group vectors such that each group vector corresponds to a separate agreement score. In some embodiments, in response to a portion of the one or more agreement scores exceeding an agreement threshold value, the event may be associated with one or more event groups such that each event group may be associated with the group vector that corresponds to the separate agreement score that exceeds the agreement threshold value. And, in some embodiments, in response to another portion of the one or more agreement scores being less than a disagreement threshold value, the event may be disassociated from each of the one or more event groups that may be associated with a group vector that may be associated with the other portion of agreement scores.

In one or more of the various embodiments, the hash function may be employed to generate one or more additional key values that correspond to one or more pairs of words that may be included in the message information. And, in some embodiments, the one or more additional key values may be included in the message vector such that each additional key value may correspond to a component in the message vector that corresponds to another key value may be set to a value of one.

In one or more of the various embodiments, non-semantic information may be determined from the message information based on one or more of pattern matching, parsing, regular expressions, or the like. In some embodiments, the non-semantic information may be removed from the message information such that the non-semantic information may be excluded from the message vector.

In one or more of the various embodiments, feedback information may be provided from a user such that the feedback may be one or more or more of associating another event with an event group or disassociating the other event with the event group. In one or more of the various embodiments, a learner object may be generated based on another message vector that may be associated with the other event and a group vector that may be associated with the event group. And, in some embodiments, the learner object may be employed to generate agreement scores that may be associated with the user.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 111, wireless network 110, client computers 101-104, monitoring server computer 114, operations management server computer 116, application server computer 118, or the like.

At least one embodiment of client computers 101-104 is described in more detail below in conjunction with FIG. 2. In one embodiment, at least some of client computers 101-104 may operate over one or more wired or wireless networks, such as networks 110, or 111. Generally, client computers 101-104 may include virtually any computer capable of communicating over a network to send and receive information, perform various online activities, offline actions, or the like. In one embodiment, one or more of client computers 101-104 may be configured to operate within a business or other entity to perform a variety of services for the business or other entity. For example, client computers 101-104 may be configured to operate as a web server, firewall, client application, media player, mobile telephone, game console, desktop computer, or the like. However, client computers 101-104 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 101-104 may include virtually any portable computer capable of connecting to another computer and receiving information such as, laptop computer 102, mobile computer 104, tablet computers 103, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 101-104 typically range widely in terms of capabilities and features. Moreover, client computers 101-104 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 101-104 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, file system management server computer 116, or other computers.

Client computers 101-104 may further be configured to include a client application that enables an end-user to log into an end-user account that may be managed by another computer, such as operations management server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, or interactive user-interfaces.

Wireless network 110 is configured to couple client computers 102-104 and its components with network 110. Wireless network 110 may include any of a variety of wireless sub-networks that may further overlay stand-alone ad-hoc networks, and the like, to provide an infrastructure-oriented connection for client computers 102-104. Such sub-networks may include mesh networks, Wireless LAN (WLAN) networks, cellular networks, and the like. In one embodiment, the system may include more than one wireless network.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 102-104 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 110 may include virtually any wireless communication mechanism by which information may travel between client computers 102-104 and another computer, network, a cloud-based network, a cloud instance, or the like.

Network 111 is configured to couple network computers with other computers, including, operations management server computer 116, client computers 101, and client computers 102-104 through wireless network 110, or the like. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 111 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of operations management server computer 116 is described in more detail below in conjunction with FIG. 3. Although FIG. 1 illustrates operations management server computer 116, or the like, each as a single computer, the innovations or embodiments are not so limited. For example, one or more functions of operations management server computer 116, or the like, may be distributed across one or more distinct network computers. Moreover, in one or more embodiments, operations management server computer 116 may be implemented using a plurality of network computers. Further, in one or more of the various embodiments, operations management server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
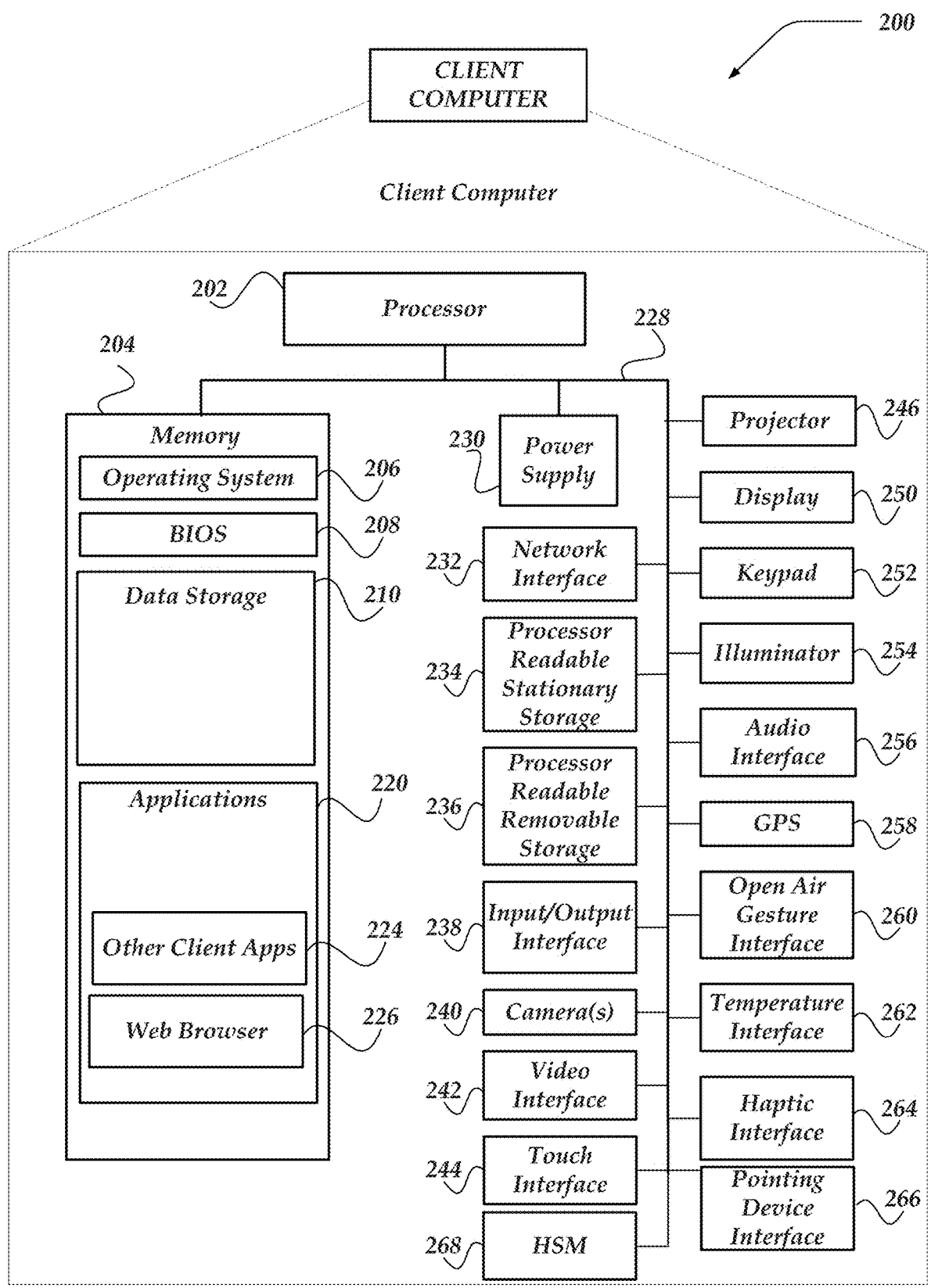
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In one or more of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, user-interfaces, reports, as well as internal processes or databases. In one or more of the various embodiments, geo-location information used for selecting localization information may be provided by GPS 258. Also, in some embodiments, geolocation information may include information provided using one or more geolocation protocols over the networks, such as, wireless network 110 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
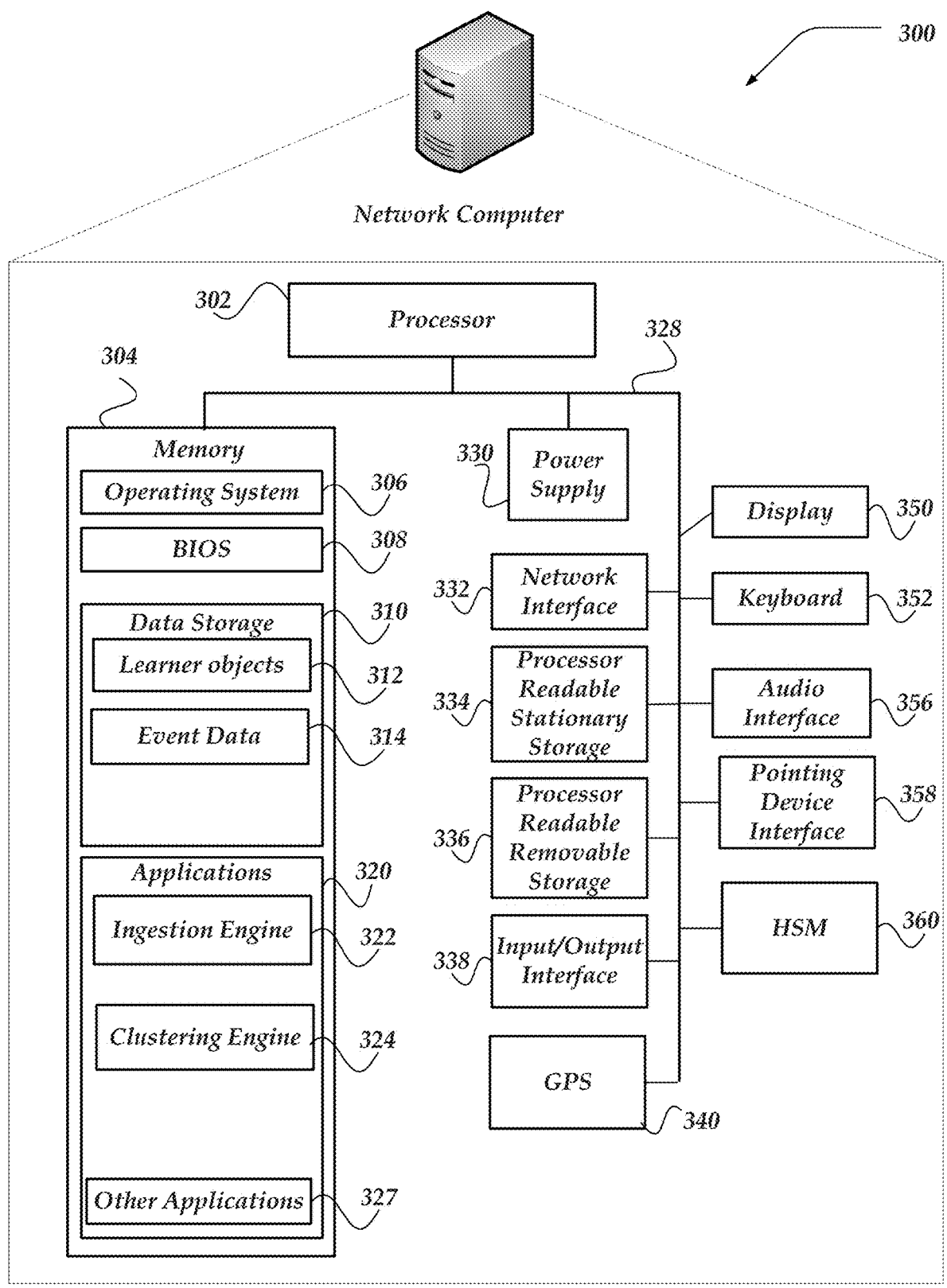
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a operations management server such as operations management server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In one or more of the various embodiments, applications, such as, operating system 306, ingestion engine 322, clustering engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In one or more of the various embodiments, geo-location information used for selecting localization information may be provided by GPS 340. Also, in some embodiments, geolocation information may include information provided using one or more geolocation protocols over the networks, such as, wireless network 110 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, learner objects 312, event data 314, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, clustering engine 324, web services 329, or the like, that may be arranged to perform actions for embodiments described below. In one or more of the various embodiments, one or more of the applications may be implemented as modules or components of another application or engine. Further, in one or more of the various embodiments, applications may be implemented as operating system extensions, modules, plugins, or the like.

Furthermore, in one or more of the various embodiments, ingestion engine 322, clustering engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, clustering engine 324, web services 329, or the like, may be provisioned and de-commissioned automatically.

Also, in one or more of the various embodiments, ingestion engine 322, clustering engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
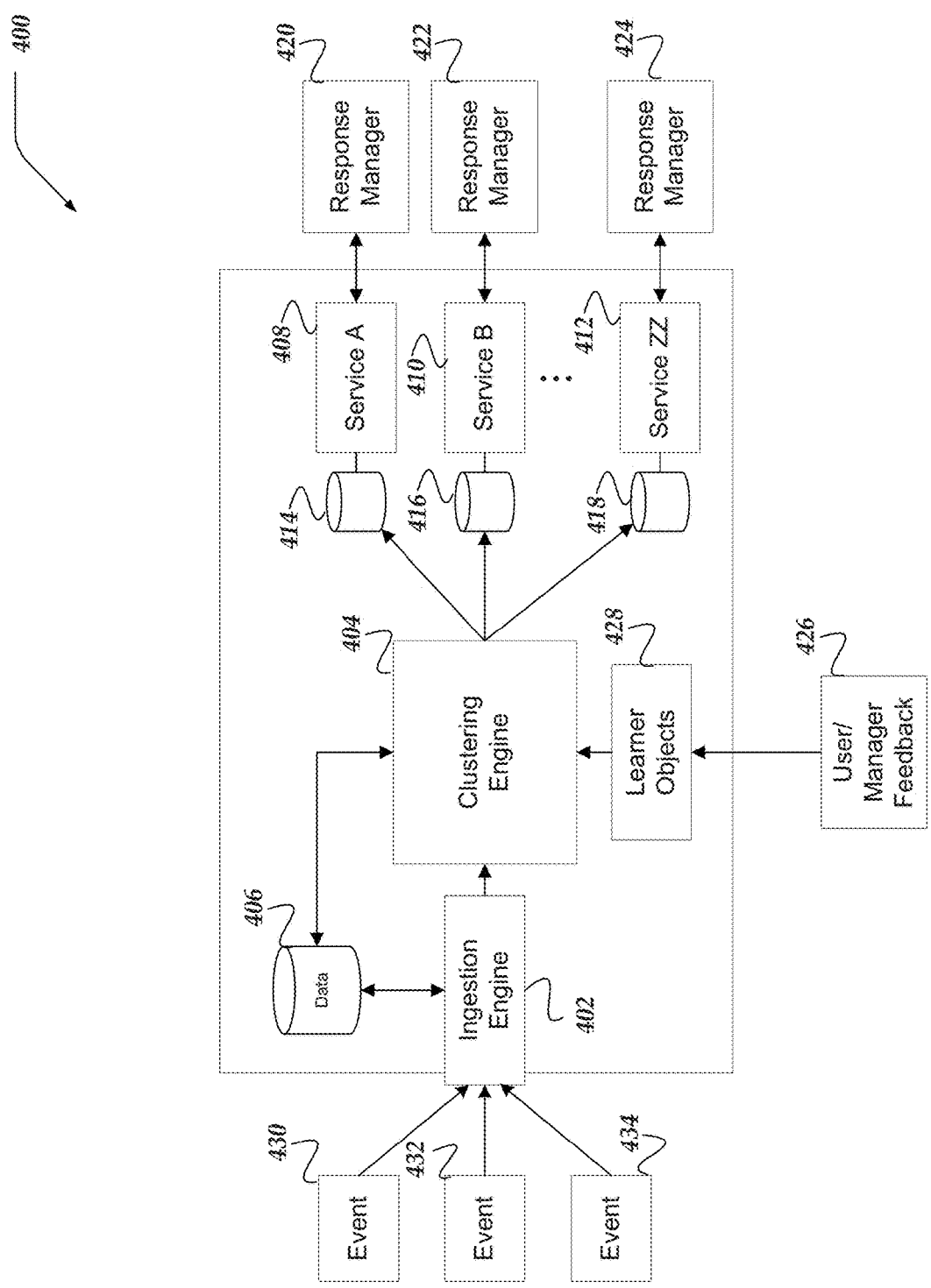
FIG. 4 illustrates a logical architecture of a system for inline categorizing of events in accordance with at least one of the various embodiments.

FIG. 4 illustrates a logical architecture of system 400 for inline categorizing of events in accordance with one or more of the various embodiments. In one or more of the various embodiments, a system for inline categorizing of events may comprise various components. In this example, system 400 includes, ingestion engine 402, clustering engine 404, database 406, service A 408, service B 410, service ZZ 412, service data 414, service data 416, service data 418, response manager 420, response manager 422, response manager 424, user/manager feedback 426, learner objects 428, event 430, event 432, event 434, or the like.

In one or more of the various embodiments, an ingestion engine such as ingestion engine 402 may be arranged to receive or obtain one or more different types of events provided by various sources, here represented by event 430, event 432, and event 434. In one or more of the various embodiments, events may be variously formatted messages that reflect the occurrence of events or incidents that have occurred in an organization's computing system. Such events may include alerts regarding system errors, warnings, failure reports, customer service requests, status messages, or the like. Events may be collected by one or more external services and provided to system 400. Events, as described above may be comprised of SMS messages, HTTP requests/posts, API calls, log file entries, trouble tickets, emails, or the like. In at least one of the various embodiments, events may include associated information, such as, source, time stamps, status indicators, or the like, that may be tracked. Also, in some embodiments, events, may also be associated with one or more service teams that may be responsible for resolving the issues related to the events.

Accordingly, ingestion engine 402 may be arranged to receive the various events and perform various actions, including, filtering, reformatting, information extraction, data normalizing, or the like, or combination thereof, to enable the events to be stored and processed. In one or more of the various embodiments, information associated with events or the events themselves may be stored in database 406.

In one or more of the various embodiments, events may be provided by one or more organizations. In some embodiments, there may be several organization (e.g., 100's, 1000's, or the like) that provide events to the system. Events from different organizations may be segregated from each other so that an organization may only interact with events that are owned by it. However, system 400 may be arranged to have visibility to all of the events enabling community wide analysis to be performed.

In one or more of the various embodiments, ingestion engine 402 may be arranged to normalize incoming events into a unified common event format. Accordingly, in some embodiments, ingestion engine 402 may be arranged to employ configuration information, including, rules, templates, maps, dictionaries, or the like, or combination thereof, to normalize the fields and values of incoming events to the common event format.

In one or more of the various embodiments, clustering engine 404, may be arranged to execute one or more clustering processes to group events. As described in more detail below, clustering engine 404 may be arranged to group events into event groups based on one or more characteristics of the events.

In one or more of the various embodiments, clustering engine 404 may be arranged to group events to enable them to be provided to one or more operations management services, such as, service A 408, service B 410, service ZZ 412, or the like. In some embodiments, services may be configured by users or organizations to collect events or manage incidents for one or more applications, services, or areas of operation, or the like, of an organization. In this example, for some embodiments, service data stores, such as, service data 414, service data 416, service data 418, or the like, represent events or event information that may be stored or collected for a given service. In some embodiments, the various data stores may be stored on a single database. Likewise, in some embodiments, the data stores may be distributed or separated from each other.

Accordingly, in one or more of the various embodiments, routing events to the applicable service enables one or more responsible users to resolve or otherwise respond to events. In some embodiments, response manager 420, response manager 422, response manager 424, or the like, represent one or more applications, such as, incident management applications, or the like, that may be monitored or managed by one or more users.

Further, in one or more of the various embodiments, system 400 may be arranged to include one or more applications, user interfaces, or the like, that enable users, administrators, response managers, or the like, to provide feedback associated with the grouping of events. Accordingly, in one or more of the various embodiments, users may provide feedback information that indicates if an event grouping or non-grouping may be incorrect. For example, in some embodiments, operations management systems, such as, system 400 may be arranged to enable users to review event groupings and provide input that indicates an event associated with a group may be incorrect. Likewise, in some embodiments, system 400 may be arranged to enable users to provide input that indicates an event that was not associated with a group should have been associated with the group.

In one or more of the various embodiments, feedback from users regarding the quality of event grouping may be captured to generate one or more learner objects, such as learner objects 428. In one or more of the various embodiments, learner objects may be data structures that may be associated with users, services, accounts, response managers, or the like. For example, in some embodiments, each user may have its own account or each service may be associated with one or more accounts. In other embodiments, an organization may have one learner object for the entire organization. Accordingly in one or more of the various embodiments, clustering engines may be arranged to employ rules, instructions, or the like, provided via configuration information to determine how learner objects may be associated with users, services, accounts, organizations, or the like.

In one or more of the various embodiments, as events arrive to system 400, they may be processed to identify or determine one or more text string components of a given event. In some embodiments, the entire event may be a text string, such as, a log record, email, text message, or the like. Also, in some embodiments, event text may be embedded in a other data structures, encrypted, compressed, encoded, or the like. Accordingly, in one or more of the various embodiments, ingestion engines may be arranged to perform one or more actions to determine the text strings included in an event. In one or more of the various embodiments, ingestion engines may be arranged to employ parsers, grammars, rules, filters, templates, or the like, provided via configuration information to determine or extract text information (e.g., message information) from incoming events.

Accordingly, in one or more of the various embodiments, the message information may be provided to a clustering engine, such as, clustering engine 404 for additional processing.

In one or more of the various embodiments, clustering engine 404 may be arranged to generate a message vector based on the message information. Accordingly, in some embodiments, the message vector may be compared with one or more group vectors to determine a similarity score that represents how close the message vector matches each group vector. In some embodiments, if one or more of the similarity scores exceed a defined threshold value, the event associated with the message vector may be associated with the one or more event groups that may be associated with one or more group vectors determined to be similar to the message vector.

In one or more of the various embodiments, if a message vector may be determined to be similar to a group vector, the message vector may be added (component-wise) to that group vector. Accordingly, in some embodiments, as similarities are determined, the group vector may be tuned or refined based on incorporating the component values of similar message vectors in the group vector.

Further, in one or more of the various embodiments, users may be enabled to provide feedback regarding the grouping of events. Accordingly, in some embodiments, users may employ one or more user interfaces to grade or otherwise indicate their agreement or disagreement with the grouping of individual events.

Accordingly, in one or more of the various embodiments, clustering engines may be arranged to associate learner objects with users or accounts to capture the user feedback for incorporation into grouping events. In some embodiments, learner objects may include information that may be employed to generate a score that may indicate if the learner object agrees with the grouping decision made by the clustering engine. Thus, in some embodiments, clustering engines may be arranged to evaluate message vectors using a learner object associated with the user or organization to generate an agreement score that may be employed to override a grouping decision.

In one or more of the various embodiments, clustering engines may be arranged to store a record of similarity overrides so they may be reviewed by users or organizations as needed.

Figure 5:
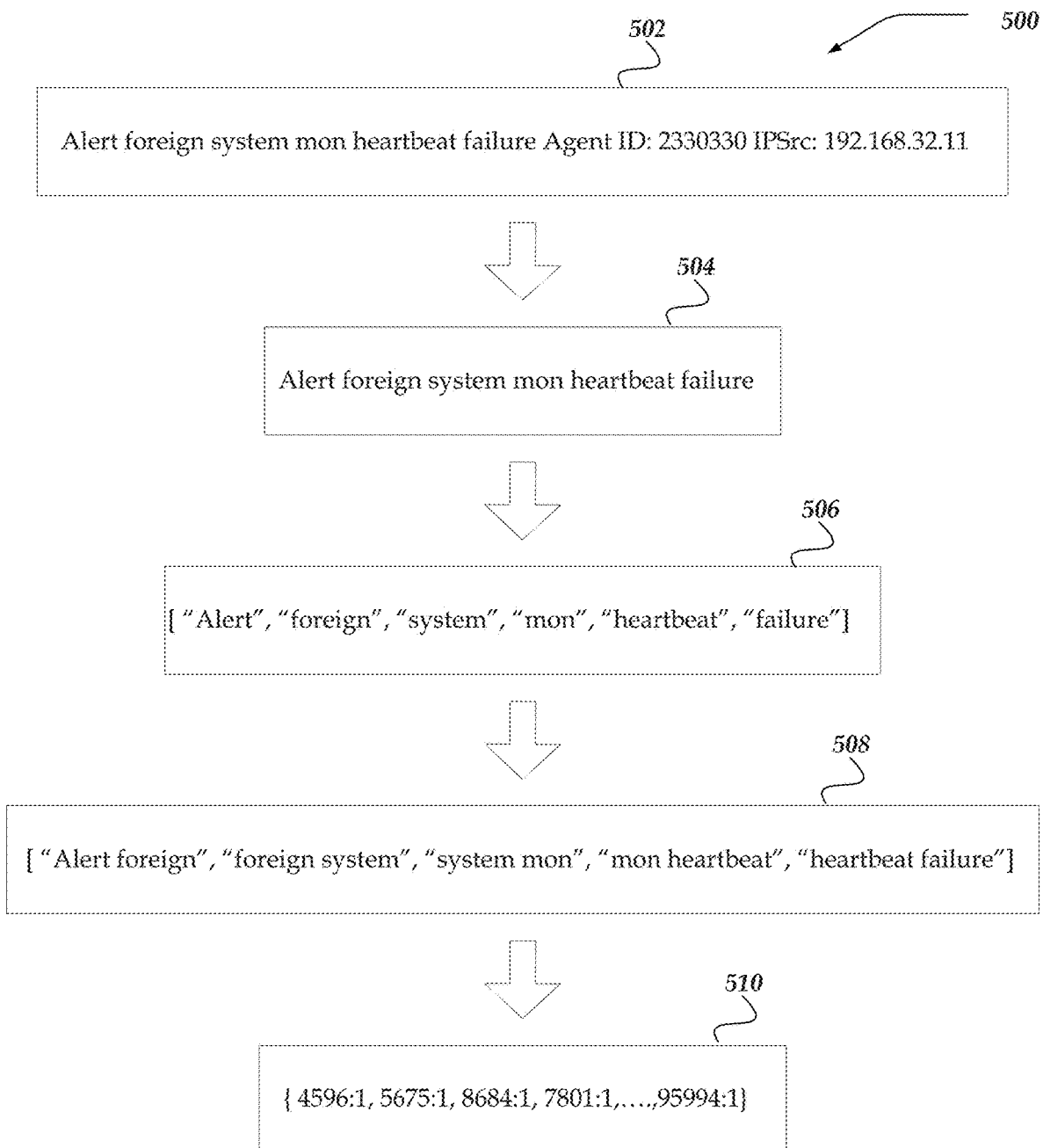
FIG. 5 illustrates a logical flow of a portion of the operations of a clustering engine for inline categorizing of events in accordance with one or more of the various embodiments.

FIG. 5 illustrates a logical flow of a portion of the operations of clustering engine 500 for inline categorizing of events in accordance with one or more of the various embodiments. As described above, in some embodiments, clustering engines may be provided message information associated with events.

In this example, for some embodiments, message information may be provided to a clustering engine. In some embodiments, the event text information may be provided as is or after initial processing has been performed by an ingestion engine. In one or more of the various embodiments, the message information may be in one or more data structures or data packets provided via one or more interfaces, databases, streams, APIs, or the like. In one or more of the various embodiments, the particular delivery mechanism may vary depending on local circumstances, local requirements, event providers, or the like. Accordingly, in some embodiments, clustering engines may be arranged to employ instructions, rules, or the like, provided via configuration information to manage message information delivery.

At step 502, in some embodiments, the text string may be considered to represent text associated with an event generated for an organization regarding one or more network services.

In one or more of the various embodiments, clustering engines may be arranged to remove portions of the text associated with individual or unique characteristics that may be considered non-semantic because the removed portions may not contribute to the meaning of the message. Rather, in some embodiments, the removed information may be associated unique instances of messages that may otherwise have the same meaning. For example, in some embodiments, timestamps, GUIDs, IP addresses, user IDs, sequence numbers, or the like, may be determined to be removable non-semantic information.

At step 504, in some embodiments, for some embodiments, the clustering engine has removed the non-semantic information from the message information. In some embodiments, clustering engines may be arranged to employ one or more regular expressions, templates, filters, grammars, parsers, or the like, that may be provided or determined via configuration information to remove undesirable non-semantic information from text information.

At step 506, in some embodiments, for some embodiments, the clustering engine has generated a list of the individual words included in the text information. In some embodiments, clustering engines may be arranged to determine individual words from the message information. In some embodiments, clustering engines may be arranged to employ one or more conventional or custom mechanisms to automatically generate the list of individual message words. Accordingly, in some embodiments, clustering engines may be arranged to employ one or more regular expressions, grammars, parsers, filters, maps, or the like, to generate the list of message words.

At step 508, in some embodiments, for some embodiments, the clustering engine may be arranged to generate a list of 2-grams from the message string. In some embodiments, clustering engines may perform actions similar as described above, except each item in the 2-gram list may be comprised of two adjacent words paired together. As shown in FIG. 5, words may appear more than once in the 2-gram list, for example, the first item at step 508 is "Alert foreign" and second item is "foreign system" where the word "foreign" may be included in a 2-gram with its left adjacent neighbor and in another 2-gram with its right adjacent neighbor.

At step 510, in some embodiments, for some embodiments, the clustering engine may be arranged to apply a hash function to each word in the list generated at step 506 and to each 2-gram generated at step 508. In some embodiments, clustering engines may be arranged to employ a hash function that generates key values for a defined key space. For example, in some embodiments, a clustering engine may be arranged to employ a hash function that given a string of any length produces a hash key that has values from 0-2^20 (e.g., 0-1,048,577). In some embodiments, the particular hash function or key size may be selected based on various factors, including, the particular application, local circumstances, local requirements, predominant languages (locale), CPU/GPU characteristics, or the like. Accordingly, in one or more of the various embodiments, the clustering engines may be arranged to employ rules, instructions, parameter values, or the like, provided via configuration information to determine the hash function or key size employed at step 510.

In one or more of the various embodiments, the clustering engine may be arranged to provide a message vector with the same number of components as the size of the key space of the hash function.

In one or more of the various embodiments, the clustering engine may be arranged to employ the key value associated with each message word or message 2-gram to determine an component in the message vector to represent the word or 2-gram. Accordingly, in some embodiments, the vector component corresponding to each hash key may be set to a value of one (1). For example, for some embodiments, if a hash function generates a key value of 5670 for a message word, component 5670 in the message vector may be set to one.

In one or more of the various embodiments, clustering engines may be arranged to represent the message vector using a sparse vector data structure that includes a component for each hash key value and omits components assumed to have a value of zero (0). For example, the message vector shown at step 510 includes entries, such as, 4596:1, 5675:1, and so on. In this example, entry 4596:1 may represent that component 4596 of the message vector is set to one (1). Likewise, in this example, entry 5675:1 may represent that component 5675:1 in the message vector is set to one (1). In some embodiments, other data structures or memory arrangements may be employed to represent message vectors. However, in the interest of brevity and clarity, additional examples have been omitted. And, one of ordinary skill in the art will appreciate that the provided examples are at least sufficient to disclose the innovations described herein.

Accordingly, in one or more of the various embodiments, clustering engines may be arranged to generate a message vector, as described based on each event provided by the ingestion engine. In some embodiments, message vectors may be generated in real-time as events are received. Also, in one or more of the various embodiments, message vectors may be generated off-line from one or more event archives, log files, or the like.

Figure 6:
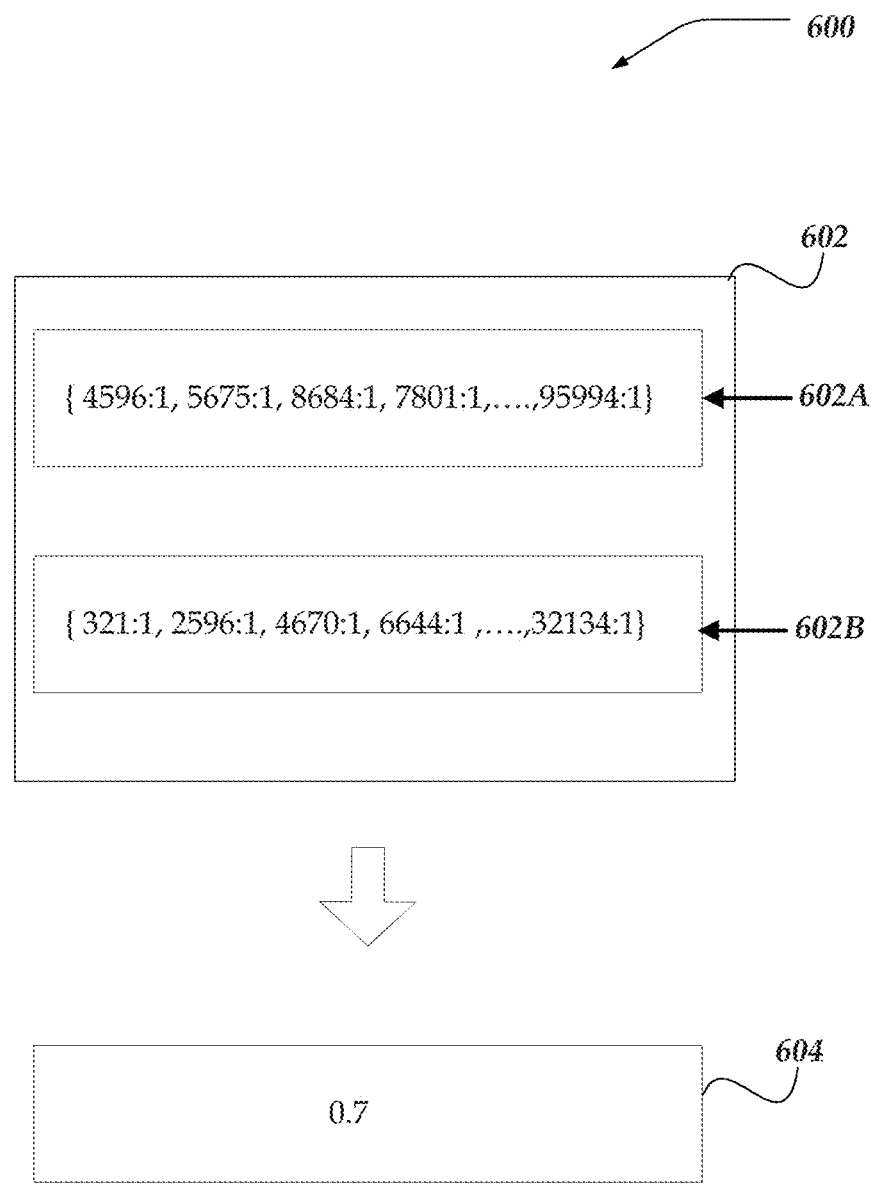
FIG. 6 illustrates a logical flow of a portion of the operations of a clustering engine for inline categorizing of events in accordance with one or more of the various embodiments.

FIG. 6 illustrates a logical flow of a portion of the operations of clustering engine 600 for inline categorizing of events in accordance with one or more of the various embodiments. As described above, in some embodiments, clustering engines may be arranged to generate message vectors from events.

In one or more of the various embodiments, clustering engines may be arranged to determine the similarity between two message vectors based the cosine similarity between the two vectors. In some embodiments, generating the cosine similarity provides a scalar value from 0-1 that represents the cosine of the angle between the two vectors. Accordingly, the cosine similarity for two vectors may be employed as a similarity score to measure the similarity between two vectors. For example, if two vectors have the same orientation the cosine similarity value will 1.0 and if they are oriented 90 degrees to each other, the cosine similarity will be 0.0. Cosine similarity may be generated by performing a vector dot product of each vector and dividing that result by product of the magnitudes the two vectors.

Accordingly, at step 602, in some embodiments, a clustering engine may be arranged to determine the similarity of message vector 602A and message vector 602B by generating a similarity score based on the cosine similarity of message vector 602A and message vector 602B.

At step 604, in some embodiments, a similarity score of 0.7 has been generated. Accordingly, in some embodiments, if this value exceeds a similarity threshold, the two message vectors may be considered similar.

In one or more of the various embodiments, message vectors determined to be similar may be considered a group (here a group of two). Accordingly, in one or more of the various embodiments, if two message vectors may be determined to be similar, clustering engines may be arranged to generate a group vector by adding the two message vectors together (component-wise).

In one or more of the various embodiments, clustering engines may be arranged to determine similarity scores for incoming message vectors and group vectors. Accordingly, in one or more of the various embodiments, message vectors determined to be sufficiently similar to one or more group vectors may be added to the determined one or more group vectors. Further, in one or more of the various embodiments, the events associated with the message vectors may be associated with the event groups that may be associated with the group vectors.

Also, in one or more of the various embodiments, clustering engines may be arranged to generate one or more reports that show event groups associated with a service. In some cases, in some embodiments, the reports may include unlabeled groups that were otherwise unknown. Accordingly, in some embodiments, users may be enabled name or label these newly discovered groups.

Further, in some embodiments, clustering engines may be arranged to evaluate message vectors or group vectors associated with different services (e.g., Service A 408 or Service B 410) for similarity. Accordingly, in one or more of the various embodiments, clustering engines may enable efficient cross service event grouping that otherwise may be unexpected or difficult to discover. For example, similarity scores generated for message vectors associated with one service and group vectors for another service may be evaluated to determine cross service groupings or similarity.

Note, in one or more of the various embodiments, as new previously unseen events are provided, new groups may be automatically generated as similar message vectors associated with the new events may be determined. Accordingly, in one or more of the various embodiments, this provides an advantageous improvement because the clustering engines may learn new groups on-the-fly without requiring off-line training commonly required for conventional machine learning classifiers.

Figure 7A:
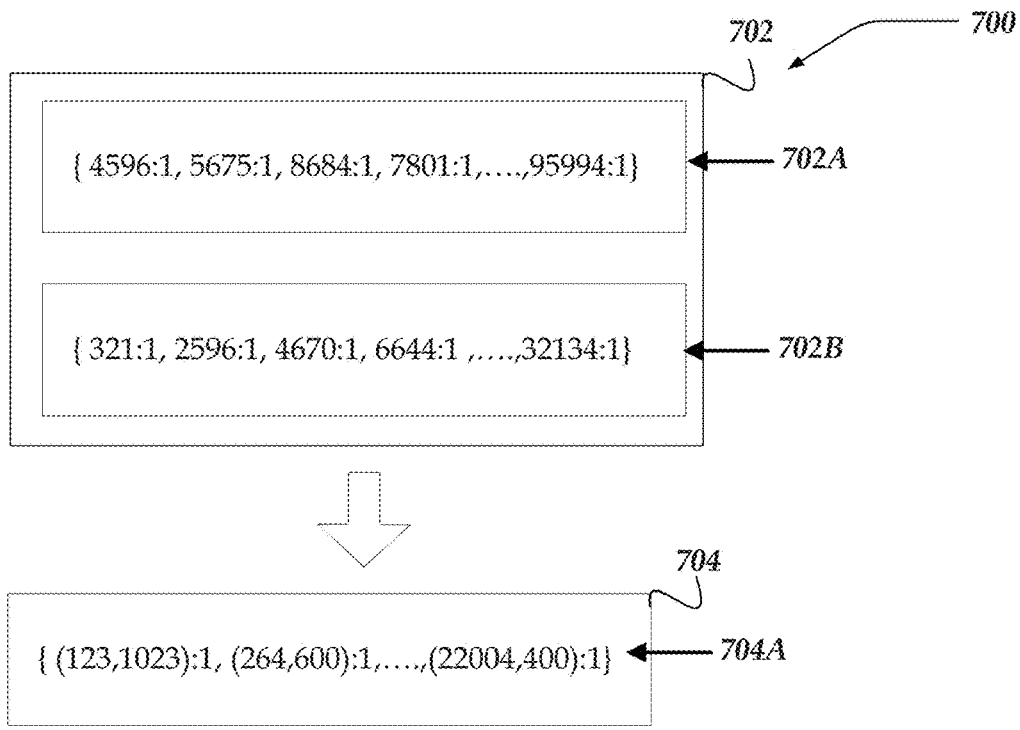
FIG. 7A illustrates the logical flow for generating or adapting learner objects in accordance with one or more of the various embodiments.
Figure 7B:
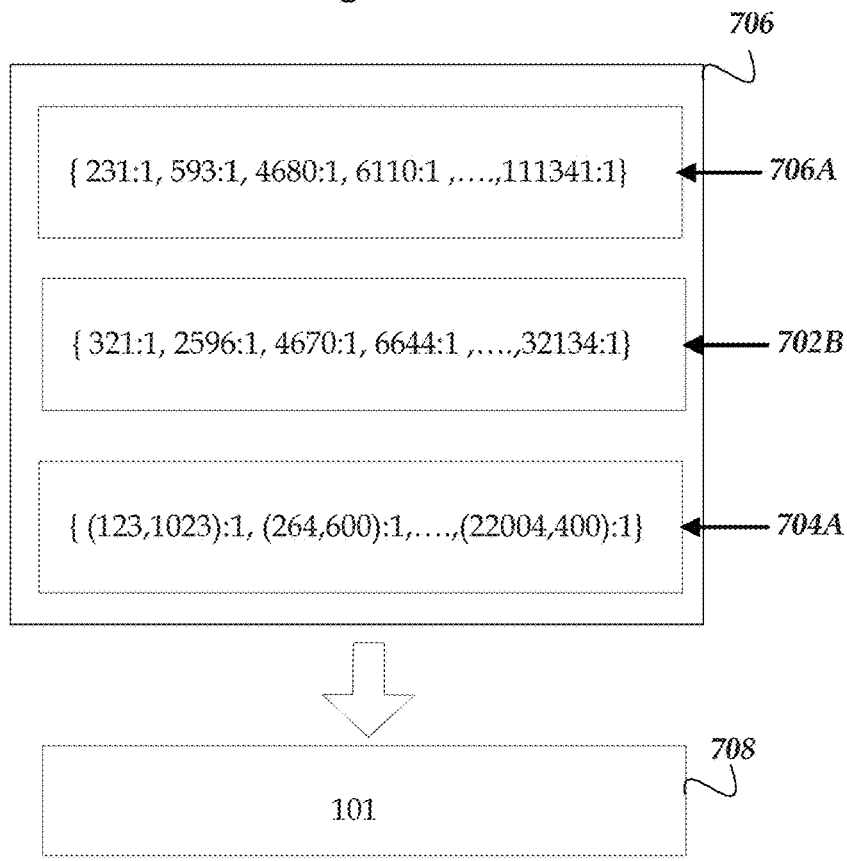
FIG. 7B illustrates the logical flow for employing learner objects in accordance with one or more of the various embodiments.

FIGS. 7A and 7B illustrate the logical flows of a portion of the operations of clustering engine 700 for inline categorizing of events in accordance with one or more of the various embodiments. As described above, in some embodiments, clustering engines may be arranged to generate learner object data structures that may be employed to introduce user feedback into event grouping. In one or more of the various embodiments, clustering engines may be arranged to enable users to associate one or more selected events with event groups that had similarity scores that fell below the similarity threshold. Likewise, in some embodiments, clustering engines may be arranged to enable users to disassociate one or more selected events from groups that had similarity scores that were above the similarity threshold.

Accordingly, in one or more of the various embodiments, clustering engines may be arranged to generate learner objects that may be associated with users, accounts, organizations, or the like. Accordingly, in one or more of the various embodiments, a learner object may be adapted to particular users, organizations, or accounts.

FIG. 7A illustrates the logical flow for generating or adapting learner objects in accordance with one or more of the various embodiments.

At step 702, in some embodiments, a user may be disassociating an event corresponding to message vector 702A from a group corresponding to group vector 702B.

In one or more of the various embodiments, the first time a learner object may be needed may be if a user selects an event to associated or disassociated with a event group. For example, if a user indicates that an event should be disassociated from a group it was previously associated with, the clustering engine may be arranged to generate a learner object for that user.

In one or more of the various embodiments, if a user employs a user-interface to select an event they want to disassociate from an event group, a clustering engine may be arranged to determine the corresponding message vector and group vector that may be stored in a service data store or other database. Similarly, in some embodiments, if a user may select an event to associate with an event group, the clustering engine may determine the message vector and group vector based on the selected event and event group.

In this example, message vector 702A may be considered the message vector for the selected event and group vector 702B may be considered the group vector for the event group of interest.

At step 704, in some embodiments, the clustering engine has generated learner object 704A based on message vector 702A and group vector 702B.

Accordingly, in one or more of the various embodiments, the clustering engine may be arranged to produce a matrix based on the outer product of message vector 702A and group vector 702B (e.g., message vector*group vector). In some embodiments, if there is no previously created learner object, the clustering engine may provide a zero valued matrix as an initial start value. Otherwise, in some embodiments, if the learner object was created previously, the clustering engine may provide a matrix from the existing learner object.

In one or more of the various embodiments, if the user may be associating an event with an event group, the outer product of message vector 702A and group vector 702B may be added to the learner object matrix (component-wise). Alternatively, if the user may be disassociating an event from an event group, the outer product of message vector 702A and group vector 702B may be subtracted from the learner object matrix (component-wise). Accordingly, in some embodiments, as a user associates or disassociates events and event groups, their associated learner object may be updated. If it may be the first time a user associates or disassociates events and event groups, the learner object may be created and initialized with the event and event group selected by the user.

In one or more of the various embodiments, learner objects may include a matrix that may be represented using a sparse matrix data structure, such that, zero valued components may be omitted. In some embodiments, other data structures or memory arrangements may be employed to represent learner object matrices. However, in the interest of brevity and clarity, additional examples have been omitted. And, one of ordinary skill in the art will appreciate that the provided examples are at least sufficient to disclose the innovations described herein.

Accordingly, in one or more of the various embodiments, clustering engines may be arranged to employ databases, service data stores, or the like, to store learner objects and associate them with users, accounts, organizations, or the like.

FIG. 7B illustrates the logical flow for employing learner objects in accordance with one or more of the various embodiments.

In one or more of the various embodiments, clustering engines may be arranged to employ learner objects to identify if users, or the like, have expressed an intent to override similarity grouping. Accordingly, in one or more of the various embodiments, as events may be provided to a clustering engine, learner objects, if available, may be employed to generate an agreement score that indicates whether the learner object agrees with a similarity determination.

In one or more of the various embodiments, agreement scores may be generated for each message vector and group vector separately from the similarity scoring.

At step 706, in some embodiments, a message vector, such as, message vector 706A may be provided for an incoming event. Accordingly, in some embodiments, the clustering engine may be arranged to select a group vector, such as, group vector 702B that corresponds to the event group being considered. Note, in one or more of the various embodiments, the group vector may be the group vector for the same group that was used to generate or adapt the learner object. Further, in some embodiments, the clustering engine may determine a learner object for the user, such as, learner object 704A. In some embodiments, if the message vector, group vector, and learner object have been determined, the clustering engine may be arranged to generate the agreement score for the incoming message vector.

At step 708, in some embodiments, the clustering engine may be arranged to generate the agreement score. In one or more of the various embodiments, clustering engines may be arranged to generate agreement scores for a message vector v and a group vector g by generating the outer product vg. This result may be employed as a mask for the learner object matrix L by generating the Kronecker product between the two and retaining those entries of L for which there is a nonzero entry in vg (the outer product the message vector and the group vector). Accordingly, the sum of these non-zero entries provides a scalar value that may be considered to be the agreement score.

In one or more of the various embodiments, if a learner object produces a large positive agreement score for an event and an event group, the clustering engine may be arranged to disregard a low similarity score and associate the event with the event group. Likewise, in one or more of the various embodiments, if a learner object produces a large negative agreement score for an event and an event group, the clustering engine may be arranged to a disregard a high similarity score and refrain from associating the event with the event group.

Generalized Operations

Figure 8:
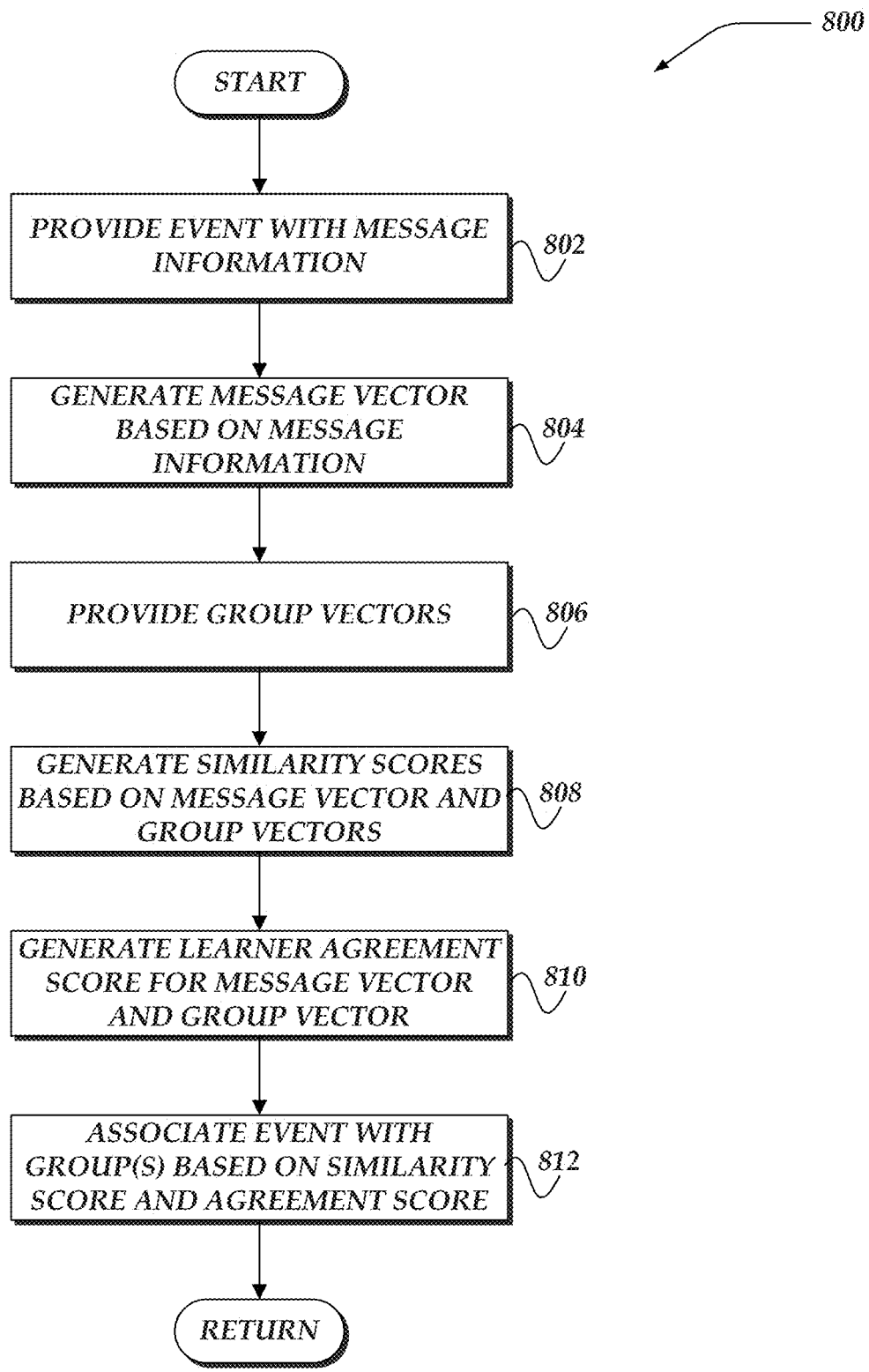
FIG. 8 illustrates an overview flowchart for a process for inline categorizing of events in accordance with one or more of the various embodiments.
Figure 9:
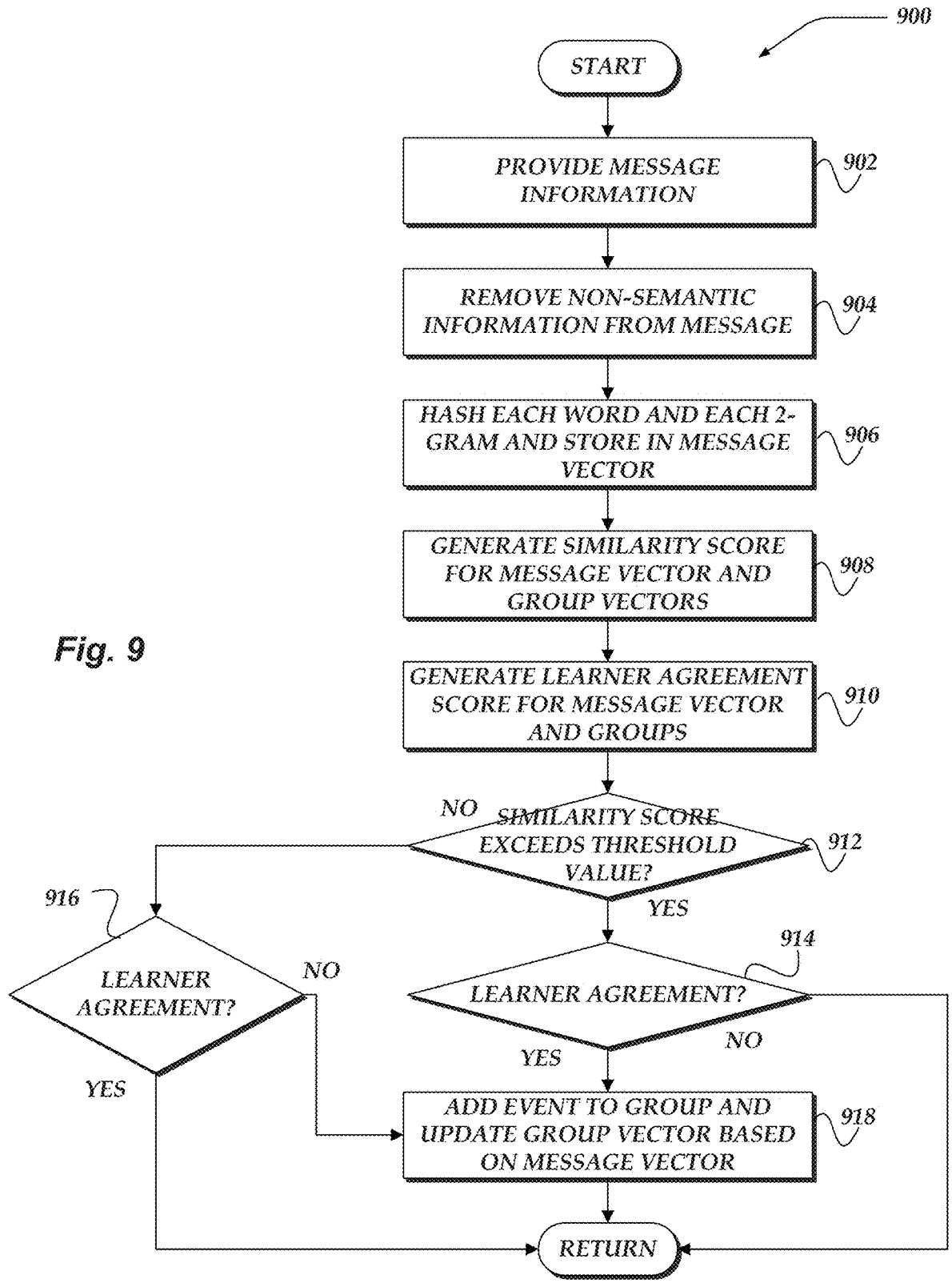
FIG. 9 illustrates a flowchart for a process for inline categorizing of events in accordance with one or more of the various embodiments.
Figure 10:
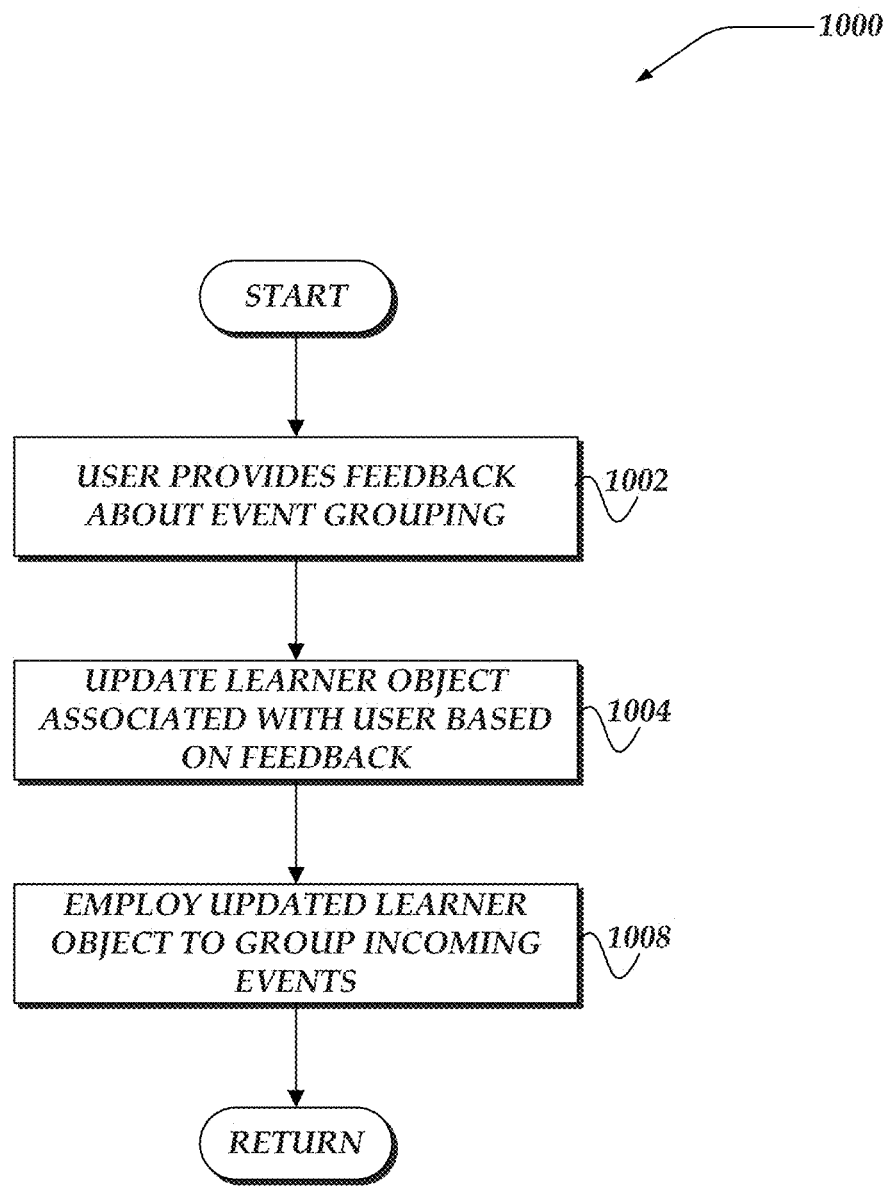
FIG. 10 illustrates a flowchart for process 1000 for inline categorizing of events in accordance with one or more of the various embodiments.

FIGS. 8-10 represent generalized operations for inline categorizing of events in accordance with one or more of the various embodiments. In one or more of the various embodiments, processes 800, 900, and 1000 described in conjunction with FIGS. 8-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may perform actions for inline categorizing of events in accordance with one or more of the various embodiments or architectures such as those described in conjunction with FIGS. 4-7. Further, in one or more of the various embodiments, some or all of the actions performed by processes 800, 900, and 1000 may be executed in part by ingestion engine 322, clustering engine 324, or the like.

FIG. 8 illustrates an overview flowchart for process 800 for inline categorizing of events in accordance with one or more of the various embodiments. After a start block, at block 802, in one or more of the various embodiments, one or more events with message information may be provided to a clustering engine. At block 804, in one or more of the various embodiments, the clustering engine may be arranged to generate message vectors for the one or more events based on the message information associated with each event. At block 806, in one or more of the various embodiments, the clustering engine may be arranged to provide one or more group vectors. At block 808, in one or more of the various embodiments, the clustering engine may be arranged to generate similarity scores based on the message vector and the one or more group vectors. At block 810, in one or more of the various embodiments, the clustering engine may be arranged to generate learner object agreement scores for the message vector and the group vectors. At block 812, in one or more of the various embodiments, the clustering engine may be arranged to associate the one or more events with one or more event groups based on the similarity scores and the agreement scores. Next, in one or more of the various embodiments, control may be returned to a calling process.

FIG. 9 illustrates a flowchart for process 900 for inline categorizing of events in accordance with one or more of the various embodiments. After a start block, at block 902, in one or more of the various embodiments, message information may be provided to a clustering engine. As described above, ingestion engines may be provided events from a variety of event sources. The ingestion engines may be arranged to perform any necessary pre-processing of events to prepare or extract message information associated with the incoming events. Accordingly, in one or more of the various embodiments, message information provided to clustering engines may include the message text, as well, meta-data that may be employed to associate the message text with the original event.

At block 904, in one or more of the various embodiments, the clustering engine may be arranged to remove the non-semantic information from the message information. As described above, non-semantic information may include IP addresses, GUIDs, MAC addresses, timestamps, serial numbers, sequence numbers, or the like, that may included in the message text. However, this information may introduce unnecessary or undesirable entropy that does not convey or relate to the meaning of the event for grouping purposes. For example, in one or more of the various embodiments, if an event's message text include a timestamp, each occurrence same type of event may appear less similar than expected because each instance would have a different timestamp value.

Note, in some embodiments, the non-semantic information may remain associated or included in the event or included as meta-data. Accordingly, in some embodiments, it may be available to other services or applications for sorting, filtering, or the like.

At block 906, in one or more of the various embodiments, the clustering engine may be arranged to hash each message word and each message 2-gram included in the message information and store the generated hash key values in a message vector. As described above, clustering engines may be arranged to generate a list of individual words that may be included in the message text. Likewise, in one or more of the various embodiments, clustering engines may be arranged to generate another list that includes 2-grams comprised of adjacent words in the message text. As shown in FIG. 5, the second word in the 2-gram may be used as the first word in the next 2-gram, and so on.

Accordingly, in some embodiments, clustering engines may be arranged to employ a hash function to generate hash key values for each word in the single word list and for each 2-gram in the 2-gram list.

In one or more of the various embodiments, the hash key values may be stored in a sparse vector data structure, such that each hash key value is treated as an component position in the vector and the value at that position in the vector may be set to one. The remaining components in the vector may be considered to have a value of zero (0). In one or more of the various embodiments, vectors for incoming events may be considered message vectors.

At block 908, in one or more of the various embodiments, clustering engines may be arranged to generate similarity scores for message vectors and group vectors. As described above, in some embodiments, clustering engines may be arranged to generate similarity scores for each event and each event group. In some embodiments, clustering engines may be arranged to generate similarity scores based on the cosine similarity values for each message vector and group vector.

In some cases, in some embodiments, clustering engines may be arranged to generate similarity scores between message vectors rather than being limited to generating similarity scores for message vectors and group vectors. In some embodiments, clustering engines may be arranged to generate similarity scores for message vectors to determine if there may be new groups of message vectors. Also, in some embodiments, if a clustering engine is being initialized or put in use for the first time, there may not be any group vectors because the groups have yet to be determined. Accordingly, in some embodiments, similarity between message vectors may be evaluated to discover new groups that may result in new group vectors.

At block 910, in one or more of the various embodiments, clustering engines may be arranged to employ learner objects to generate agreement scores for message vectors and group vectors. In one or more of the various embodiments, learner objects may be associated with users, accounts, organizations, services, or the like. Accordingly, clustering engines may be arranged to retrieve learner objects that may be associated with pending operations. In some embodiments, this may include a learner object associated with an administrative account associated with the event operations management server, or the like, including a user representing one or more services or processes rather than a user representing a person.

In some embodiments, in some cases, a relevant learner object may not be available. For example, if a user has not provided explicit or implicit feedback associated with prior event grouping, a learner object may be unavailable for that user.

However, in some embodiments, if a relevant learner object may be available, it may be provided. Accordingly, in some embodiments, clustering engines may be arranged to generate agreement scores for each message vector and group vector.

At decision block 912, in one or more of the various embodiments, if the similarity score exceeds a threshold value, control may flow to decision block 914; otherwise, control may flow to decision block 916. In some embodiments, clustering engines may be arranged to determine similarity score threshold values based on configuration information to account for local circumstances or local requirements.

At decision block 914, in one or more of the various embodiments, if the relevant learner object may be in agreement, control may flow to block 918; otherwise, control may be returned to calling process.

As described above, in some embodiments, a learner object's strength of agreement or disagreement with a similarity score may be based on the magnitude of the agreement score. In some embodiments, if an agreement score value may be positive, the learner object is indicating that a message vector and group vector should be considered similar. And, in some embodiments, if an agreement score value may be a negative value, the learner object may be indicating it does not consider a message vector and a group vector as being similar. In one or more of the various embodiments, clustering engines may be arranged to employ rules, threshold values, value ranges, or the like, provided via configuration information to determine if a learner object agreement score may be strong or weak.

Accordingly, in some embodiments, if the similarity score exceeds the grouping threshold value and the learner object agreement score is weak (positive or negative with a magnitude below a threshold value), control may flow to block 918. Similarly, if the learner object agreement score is strongly positive, control may flow to block 918. However, in some embodiments, if the learner object agreement score may be strongly negative, control may be returned to calling process without associating the event with the group.

At decision block 916, in one or more of the various embodiments, if the relevant learner object may be in agreement, control may be returned a calling process; otherwise, control may flow to block 918.

In some embodiments, if the similarity score may be below the grouping threshold value and the learner object agreement score is weak or strongly negative, control may be returned to a calling process without associating the event with the event group.

Alternatively, in some embodiments, if the learner object agreement score may be strongly positive, control may flow to block 918, because the learner object agreement score may override the low similarity score.

At block 918, in one or more of the various embodiments, the clustering engine may be arranged to associate an event associated with the message information to one or more event groups and update the one or more group vectors based on the message vector. As described above, message vectors determined to be similar group vectors may be added to the similar group vectors.

Next, in one or more of the various embodiments, control may be returned to a calling process.

FIG. 10 illustrates a flowchart for process 1000 for inline categorizing of events in accordance with one or more of the various embodiments. After a start block, at block 1002, in one or more of the various embodiments, a clustering engine may be arranged to enable users to provide feedback associated with event groupings. As described above, clustering engines may be arranged to provide one or more user interfaces that enable users to review event groupings. In some embodiments, users may be enabled to provide feedback regarding the quality of event grouping. In some embodiments, users may be enabled to directly move one or more events associated with one event group to another group. In some embodiments, users may be enabled to disassociate an event from an event group while not associating it with a different event group.

In one or more of the various embodiments, clustering engines may be arranged to passively monitor whether users move events from one event group to another. Accordingly, in some embodiments, such movement of events may be automatically considered user feedback.

At block 1004, in one or more of the various embodiments, the clustering engine may be arranged to update a learner object for the user based on the provided feedback. As described above, in some embodiments, clustering engines may be arranged to perform various actions to generate new learner objects for users or update or adapt existing learner objects based on the user feedback.

Accordingly, in some embodiments, if the user does not have an associated learner object, the clustering engine may be arranged to generate a new learner object for the user. Alternatively, in some embodiments, if there may already be a learner object for the user, the clustering engines may be arranged to modify the learner object to adapt to the user feedback.

Further, in one or more of the various embodiments, the clustering engine may be arranged to determine the message vectors and the group vectors for the events and event groups of interest. In some embodiments, the group vectors may be retrieved from a data store. In some embodiments, the message vector may be regenerated from its original event, if it may be available. Also, in some embodiments, the clustering engine may be arranged to retrieve the message vector from a data store. In some embodiments, the original event may be stored and the message vector may be associated with it as well. For example, in one or more of the various embodiments, both the original event and its message vector may be stored together in a data store.

Accordingly, in some embodiments, for each event and event group pair, the clustering engine may be arranged to generate an outer product of the message vector and the group vector. In some embodiments, clustering engines may be arranged to include hardware support for performing operations such as generating outer produces from the message vector and group vector. In some embodiments, clustering engines may be arranged to employ native features of CPUs or GPUs to generate the outer product. For brevity and clarity, the details of performing the outer product operation are omitted here because one of ordinary skill in the art will appreciate that determining an outer product of two vectors is a conventional or well-known operation.

Accordingly, in some embodiments, if the user feedback indicates that the user intends to disassociate an event from an event group, the clustering engine may be arranged to subtract (component-wise) the outer product of the message vector and group vector from the matrix included in the learner object.

In one or more of the various embodiments, if the user feedback indicates that the user intends to associate an event with an event group, the clustering engine may be arranged to add (component-wise) the outer product of the message vector and group vector to the matrix included in the learner object.

At block 1008, in one or more of the various embodiments, the clustering engine may be arranged to employ the updated learner object to group incoming events.

For example, in one or more of the various embodiments, clustering engines may be arranged to generate agreement scores for a message vector v and a group vector g by generating the outer product vg. This result may be employed as a mask for the learner object matrix L by generating the Kronecker product between the two and retaining those entries of L for which there is a nonzero entry in vg (the outer product the message vector and the group vector). Accordingly, the sum of these non-zero entries provides a scalar value that may be considered the agreement score.

In one or more of the various embodiments, if a learner object produces a large positive agreement score for an event and an event group, the clustering engine may be arranged to disregard a low similarity score and associate the event with the event group. Likewise, in one or more of the various embodiments, if a learner object produces a large negative agreement score for an event and an event group, the clustering engine may be arranged to disregard a high similarity score and refrain from associating the event with the event group.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of one or more of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing operations over a network using one or more network computers that include one or more processors that perform actions, comprising:
    providing an event that is associated with one or more operations in the network;
    employing a hash function to generate one or more key values that correspond to one or more words included in message information that is associated with the event;
    generating a message vector based on the one or more key values, wherein each component in the message vector, that corresponds to a key value, is set to a value of one;
    determining one or more group vectors that have a same number of components as the message vector, wherein each group vector is associated with an event group;
    generating one or more similarity scores for the one or more group vectors based on the message vector and the one or more group vectors, wherein each group vector corresponds to a separate similarity score;
    in response to a portion of the one or more similarity scores exceeding a threshold value, associating the event with one or more event groups, wherein each event group is associated with a group vector that that corresponds to the separate similarity score that exceeds the threshold value; and
    generating an interface that visually displays a plurality of event groups to a user, wherein in response to actions in the interface, performing actions, including:
        in response to the event being moved in the interface from a first event group to a second event group, changing the association of the event from the first event group to the second event group; and in response to the event being disassociated from an event group in the interface, removing association of the event from all event groups.

2. The method of claim 1, further comprising:

determining a learner object based on an association of the learner object with one or more of a user, an account, a service, or an organization;

employing the learner object to generate one or more agreement scores based on the message vector and the one or more group vectors, wherein each group vector corresponds to a separate agreement score;

in response to a portion of the one or more agreement scores exceeding an agreement threshold value, associating the event with one or more event groups, wherein each event group is associated with the group vector that corresponds to the separate agreement score that exceeds the agreement threshold value; and in response to another portion of the one or more agreement scores being less than a disagreement threshold value, disassociating the event from each of the one or more event groups that are associated with a group vector that is associated with the other portion of agreement scores.

3. The method of claim 1, further comprising:

employing the hash function to generate one or more additional key values that correspond to one or more pairs of words that are included in the message information; and including the one or more additional key values in the message vector, wherein each additional key value corresponds to a component in the message vector that corresponds to another key value, is set to a value of one.

4. The method of claim 1, further comprising:

determining non-semantic information from the message information based on one or more of pattern matching, parsing, or regular expressions; and removing the non-semantic information from the message information, wherein the non-semantic information is excluded from the message vector.

5. The method of claim 1, wherein associating the event with the one or more event groups, further comprises, adding the message vector to each group vector that is associated with the one or more event groups.

6. The method of claim 1, further comprising:

providing feedback information from a user, wherein the feedback is one or more or more of associating another event with an event group or disassociating the other event with the event group;

generating a learner object based on another message vector that is associated with the other event and a group vector that is associated with the event group; and employing the learner object to generate agreement scores that are associated with the user.

7. The method of claim 1, wherein generating the one or more similarity scores, further comprises, computing one or more cosine similarity values based on the message vector and each of the one or more group vectors, wherein the one or more cosine similarity values are employed as the value of the one or more similarity scores.

8. A system for managing operations for organizations over a network, comprising:

a network computer, comprising:

a transceiver that communicates over the network;

a memory that stores at least instructions; and one or more processors that execute instructions that perform actions, including:

providing an event that is associated with one or more operations in the network;

employing a hash function to generate one or more key values that correspond to one or more words included in message information that is associated with the event;

generating a message vector based on the one or more key values, wherein each component in the message vector, that corresponds to a key value, is set to a value of one;

determining one or more group vectors that have a same number of components as the message vector, wherein each group vector is associated with an event group; generating one or more similarity scores for the one or more group vectors based on the message vector and the one or more group vectors, wherein each group vector corresponds to a separate similarity score;

in response to a portion of the one or more similarity scores exceeding a threshold value, associating the event with one or more event groups, wherein each event group is associated with a group vector that corresponds to the separate similarity score that exceeds the threshold value; and generating an interface that visually displays a plurality of event groups to a user, wherein in response to actions in the interface, performing actions, including:

in response to the event being moved in the interface from a first event group to a second event group, changing the association of the event from the first event group to the second event group; and in response to the event being disassociated from an event group in the interface, removing association of the event from all event groups and another network computer, comprising:

another transceiver that communicates over the network;

another memory that stores at least instructions; and one or more processors that execute instructions that perform actions, including:

generating the event that is provided to the network computer.

9. The system of claim 8, wherein the one or more network computer processors execute instructions that perform actions, further comprising:

determining a learner object based on an association of the learner object with one or more of a user, an account, a service, or an organization;

employing the learner object to generate one or more agreement scores based on the message vector and the one or more group vectors, wherein each group vector corresponds to a separate agreement score;

in response to a portion of the one or more agreement scores exceeding an agreement threshold value, associating the event with one or more event groups, wherein each event group is associated with the group vector that corresponds to the separate agreement score that exceeds the agreement threshold value; and in response to another portion of the one or more agreement scores being less than a disagreement threshold value, disassociating the event from each of the one or more event groups that are associated with a group vector that is associated with the other portion of agreement scores.

10. The system of claim 8, wherein the one or more network computer processors execute instructions that perform actions, further comprising:
employing the hash function to generate one or more additional key values that correspond to one or more pairs of words that are included in the message information; and
including the one or more additional key values in the message vector, wherein each additional key value corresponds to a component in the message vector that corresponds to another key value, is set to a value of one.

11. The system of claim 8, wherein the one or more network computer processors execute instructions that perform actions, further comprising:
determining non-semantic information from the message information based on one or more of pattern matching, parsing, or regular expressions; and
removing the non-semantic information from the message information, wherein the non-semantic information is excluded from the message vector.

12. The system of claim 8, wherein associating the event with the one or more event groups, further comprises, adding the message vector to each group vector that is associated with the one or more event groups.

13. The system of claim 8, wherein the one or more network computer processors execute instructions that perform actions, further comprising:
providing feedback information from a user, wherein the feedback is one or more or more of associating another event with an event group or disassociating the other event with the event group;
generating a learner object based on another message vector that is associated with the other event and a group vector that is associated with the event group; and
employing the learner object to generate agreement scores that are associated with the user.

14. The system of claim 8, wherein generating the one or more similarity scores, further comprises, computing one or more cosine similarity values based on the message vector and each of the one or more group vectors, wherein the one or more cosine similarity values are employed as the value of the one or more similarity scores.

15. A processor readable non-transitory storage media that includes instructions for managing operations for organizations over a network, wherein execution of the instructions by one or more hardware processors performs actions, comprising:
providing an event that is associated with one or more operations in the network;
employing a hash function to generate one or more key values that correspond to one or more words included in message information that is associated with the event;
generating a message vector based on the one or more key values, wherein each component in the message vector, that corresponds to a key value, is set to a value of one;
determining one or more group vectors that have a same number of components as the message vector, wherein each group vector is associated with an event group;
generating one or more similarity scores for the one or more group vectors based on the message vector and the one or more group vectors, wherein each group vector corresponds to a separate similarity score;
in response to a portion of the one or more similarity scores exceeding a threshold value, associating the event with one or more event groups, wherein each event group is associated with a group vector that that corresponds to the separate similarity score that exceeds the threshold value; and
generating an interface that visually displays a plurality of event groups to a user, wherein in response to actions in the interface, performing actions, including:
in response to the event being moved in the interface from a first event group to a second event group, changing the association of the event from the first event group to the second event group; and
in response to the event being disassociated from an event group in the interface, removing association of the event from all event groups.

16. The media of claim 15, further comprising:
determining a learner object based on an association of the learner object with one or more of a user, an account, a service, or an organization;
employing the learner object to generate one or more agreement scores based on the message vector and the one or more group vectors, wherein each group vector corresponds to a separate agreement score;
in response to a portion of the one or more agreement scores exceeding an agreement threshold value, associating the event with one or more event groups, wherein each event group is associated with the group vector that corresponds to the separate agreement score that exceeds the agreement threshold value; and
in response to another portion of the one or more agreement scores being less than a disagreement threshold value, disassociating the event from each of the one or more event groups that are associated with a group vector that is associated with the other portion of agreement scores.

17. The media of claim 15, further comprising:
employing the hash function to generate one or more additional key values that correspond to one or more pairs of words that are included in the message information; and
including the one or more additional key values in the message vector, wherein each additional key value corresponds to a component in the message vector that corresponds to another key value, is set to a value of one.

18. The media of claim 15, further comprising:
determining non-semantic information from the message information based on one or more of pattern matching, parsing, or regular expressions; and
removing the non-semantic information from the message information, wherein the non-semantic information is excluded from the message vector.

19. The media of claim 15, wherein associating the event with the one or more event groups, further comprises, adding the message vector to each group vector that is associated with the one or more event groups.

20. The media of claim 15, further comprising:
providing feedback information from a user, wherein the feedback is one or more or more of associating another event with an event group or disassociating the other event with the event group;
generating a learner object based on another message vector that is associated with the other event and a group vector that is associated with the event group; and
employing the learner object to generate agreement scores that are associated with the user.

21. The media of claim 15, wherein generating the one or more similarity scores, further comprises, computing one or more cosine similarity values based on the message vector and each of the one or more group vectors, wherein the one or more cosine similarity values are employed as the value of the one or more similarity scores.

22. A network computer for managing operations for organizations over a network, comprising:
a transceiver that communicates over the network;
a memory that stores at least instructions; and
one or more processors that execute instructions that perform actions, including:
providing an event that is associated with one or more operations in the network;
employing a hash function to generate one or more key values that correspond to one or more words included in message information that is associated with the event;
generating a message vector based on the one or more key values, wherein each component in the message vector, that corresponds to a key value, is set to a value of one;
determining one or more group vectors that have a same number of components as the message vector, wherein each group vector is associated with an event group;
generating one or more similarity scores for the one or more group vectors based on the message vector and the one or more group vectors, wherein each group vector corresponds to a separate similarity score;
in response to a portion of the one or more similarity scores exceeding a threshold value, associating the event with one or more event groups, wherein each event group is associated with a group vector that that corresponds to the separate similarity score that exceeds the threshold value; and
generating an interface that visually displays a plurality of event groups to a user, wherein in response to actions in the interface, performing actions, including:
in response to the event being moved in the interface from a first event group to a second event group, changing the association of the event from the first event group to the second event group; and
in response to the event being disassociated from an event group in the interface, removing association of the event from all event groups.

23. The network computer of claim 22, wherein the one or more processors execute instructions that perform actions, further comprising:
determining a learner object based on an association of the learner object with one or more of a user, an account, a service, or an organization;
employing the learner object to generate one or more agreement scores based on the message vector and the one or more group vectors, wherein each group vector corresponds to a separate agreement score;
in response to a portion of the one or more agreement scores exceeding an agreement threshold value, associating the event with one or more event groups, wherein each event group is associated with the group vector that corresponds to the separate agreement score that exceeds the agreement threshold value; and
in response to another portion of the one or more agreement scores being less than a disagreement threshold value, disassociating the event from each of the one or more event groups that are associated with a group vector that is associated with the other portion of agreement scores.

24. The network computer of claim 22, wherein the one or more processors execute instructions that perform actions, further comprising:
employing the hash function to generate one or more additional key values that correspond to one or more pairs of words that are included in the message information; and
including the one or more additional key values in the message vector, wherein each additional key value corresponds to a component in the message vector that corresponds to another key value, is set to a value of one.

25. The network computer of claim 22, wherein the one or more processors execute instructions that perform actions, further comprising:
determining non-semantic information from the message information based on one or more of pattern matching, parsing, or regular expressions; and
removing the non-semantic information from the message information, wherein the non-semantic information is excluded from the message vector.

26. The network computer of claim 22, wherein associating the event with the one or more event groups, further comprises, adding the message vector to each group vector that is associated with the one or more event groups.

27. The network computer of claim 22, wherein the one or more processors execute instructions that perform actions, further comprising:
providing feedback information from a user, wherein the feedback is one or more or more of associating another event and with an event group or disassociating the other event with the event group; and
generating a learner object based on another message vector the is associated with the other event and a group vector that is associated with the event group; and
employing the learner object to generate agreement scores that are associated with the user.

28. The network computer of claim 22, wherein generating the one or more similarity scores, further comprises, computing one or more cosine similarity values based on the message vector and each of the one or more group vectors, wherein the one or more cosine similarity values are employed as the value of the one or more similarity scores.

* * * * *